Feb. 18, 1958  M. E. FANNING  2,824,187
HYDRAULIC BRAKE SAFETY SIGNAL
Filed Oct. 15, 1954
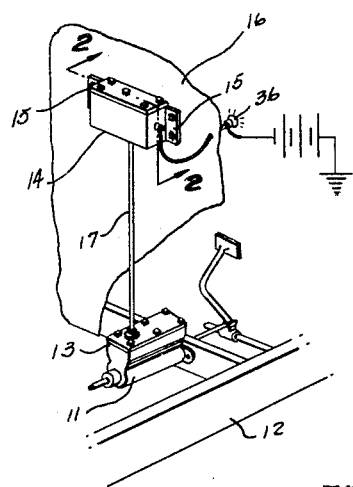
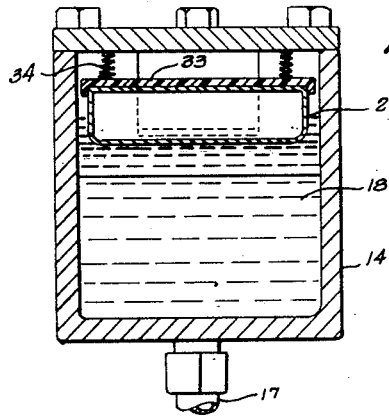
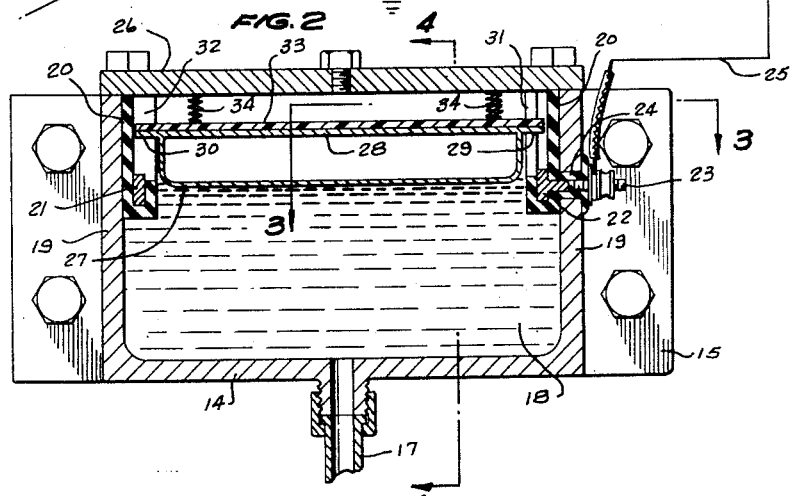
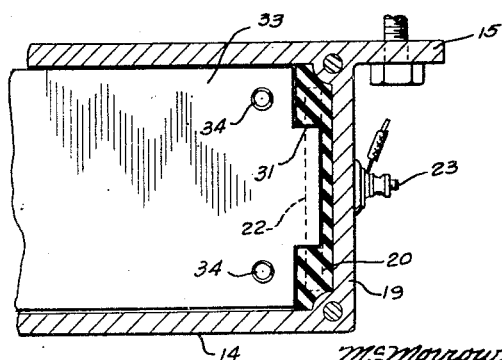
INVENTOR.
MAC E. FANNING
BY
McMorrow, Berman + Davidson
ATTORNEYS United States Patent Office 2,824,187
Patented Feb. 18, 1958

2,824,187

HYDRAULIC BRAKE SAFETY SIGNAL

Mac E. Fanning, Bokoshe, Okla.

Application October 15, 1954, Serial No. 462,529

1 Claim. (Cl. 200—84)

This invention relates to hydraulic brakes, and more particularly to an improved alarm device for use in a motor vehicle hydraulic brake system to provide a signal when the liquid in the hydraulic brake system becomes depleted.

The main object of the invention is to provide a novel and improved warning device for a hydraulic brake system to provide an indication of the depletion of the hydraulic liquid of the brake system, said device being simple in construction, being easy to install in a motor vehicle, and providing a reliable warning when the level of brake fluid in the chamber of the warning device drops below a predetermined point.

A further object of the invention is to provide an improved signal device for the hydraulic brake system of a motor vehicle to provide an indication when the liquid becomes excessively depleted, said device being inexpensive to manufacture, being durable in construction, and being adapted to be employed with any master brake cylinder, as employed in a motor vehicle.

Further objects and advantages of the invention will become apparent from the following description and claim, and from the accompanying drawings, wherein:

Figure 1 is a fragmentary perspective view of the master cylinder of a motor vehicle hydraulic brake system showing an improved warning device according to the present invention installed on the motor vehicle and connected to the master cylinder.

Figure 2 is an enlarged vertical cross sectional view taken on the line 2—2 of Figure 1, showing the electrical connections of the warning device.

Figure 3 is a fragmentary horizontal cross sectional view taken on the line 3—3 of Figure 2.

Figure 4 is a transverse vertical cross sectional view taken on the line 4—4 of Figure 2.

Referring to the drawings, 11 designates a conventional master cylinder, as employed on a motor vehicle 12, said master cylinder being provided with a hydraulic fluid reservoir 13 formed integrally therewith and containing hydraulic fluid which is supplied to the master cylinder. Designated generally at 14 is an auxiliary housing or reservoir which may be of any desirable shape, for example, rectangular, as illustrated, and which is provided with opposite side lugs 15, 15 whereby the reservoir or housing 14 may be secured to a convenient portion of the vehicle, for example, to the fire wall 16, as shown in Figure 1.

The housing 14 is connected at its bottom wall to the reservoir 13, as by a suitable conduit 17, whereby the housing 14 is in direct communication with reservoir 13. Housing 14 contains a supply of hydraulic fluid 18.

Secured in the opposite end walls 19, 19 of the housing 14 are the respective insulators 20, 20, and molded in the lower portions of the insulators are the respective transversely extending metal bars 21 and 22. Integrally formed on the metal bar 22 is a terminal stud 23 which is surrounded by an insulation sleeve 24 integrally formed with the insulator 20, as shown and extending through the end wall 19 of housing 14, whereby a wire 25 may be connected to the terminal stud 23 in the manner illustrated.

Detachably secured on the top rim of the housing 14 is the metal cover plate 26, the housing being of metal, whereby the top cover plate 26 is grounded. Designated at 27 is a generally rectangular float member which is disposed in the housing and which is supported on the hydraulic fluid 18. The float member 27 is of suitable conducting material, such as metal or the like, and is formed with the top wall 28 having the end flanges 29 and 30 which extend into recesses 31 and 32 formed in the respective insulators 20, 20. The float 27 is provided with an insulating top plate 33, and interposed between the insulating plate 33 and the top wall 26 of the housing 14 are biasing springs 34, 34, which urge the float 27 downwardly and which are normally opposed by the buoyancy of the float in the hydraulic fluid 18.

The transverse bar member 21 is connected to housing 14 in any suitable manner, whereby said transverse bar member 21 is grounded. Normally, when the hydraulic fluid 18 is at or above a safe level, the flanges 29 and 30 are elevated above the respective transverse bars 22 and 21. However, when the level of the liquid 18 drops below a safe level, the flanges 29 and 30 come into contact with the bars 22 and 21, electrically connecting the bar 22 to ground.

Mounted on the vehicle dashboard is a suitable signal lamp 36, said lamp being supported in a suitable lamp socket having one terminal connected to the wire 25. The other terminal of the lamp socket is connected by a wire 37 to the ungrounded terminal of the vehicle battery 38. Therefore, when the contact bar 22 is electrically connected to the contact bar 21 by the descent of the float 27, as above described, the lamp 36 becomes energized and provides a warning signal indicating that the level of hydraulic fluid 18 in the housing 14 has dropped below a safe value. Thus, the device provides an automatic notification to the operator of the vehicle that replenishment of the hydraulic brake fluid is required, by reason of leakage, or for any other reason.

As shown in Figure 3, each of the insulators 20 is formed with the recess 31 or 32 which receives the associated contact flange 29 or 30. Thus, the recesses 31 and 32 may comprise vertical grooves in which the contact flanges 29 and 30 are slidably received, as is clearly illustrated in Figure 3.

While a specific embodiment of an improved warning device for the hydraulic brake system of a motor vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A switch device comprising a float chamber having imperforate walls, a pair of vertically grooved insulators secured to the upper portion of opposing side walls of said float chamber adjacent the inside surfaces of said side walls, respective stationary contacts mounted on said insulators, a conductive float member movably disposed in said float chamber, said chamber having a top cover, a plurality of spaced coil springs mounted between said float member and top cover, and respective horizontal contact flanges on the upper portions of the opposite ends of said float member and being slidably interengaged with the grooves in the insulators, said contact flanges being arranged to conductively engage said stationary contacts when the fluid in the float chamber drops below a predetermined level.

(References on following page)

References Cited in the file of this patent

UNITED STATES PATENTS

| | | | |
|---|---|---|---|
| 1,202,757 | Barnes | Oct. 24, 1916 |
| 1,232,840 | Porphir | July 10, 1917 |
| 2,085,173 | Stansbury | June 29, 1937 |
| 2,253,260 | Alcorn | Aug. 19, 1941 |
| 2,278,279 | Morris | Mar. 31, 1942 |
| 2,474,929 | Boler | July 5, 1949 |
| 2,479,503 | Moore | Aug. 16, 1949 |
| 2,586,449 | Whitten | Feb. 19, 1952 |
| 2,613,293 | Marks | Oct. 7, 1952 |
| 2,744,177 | Barber | May 1, 1956 |
| 2,780,692 | Hinojosa | Feb. 5, 1957 |